US012126163B2

(12) United States Patent
Clark et al.

(10) Patent No.: US 12,126,163 B2
(45) Date of Patent: Oct. 22, 2024

(54) PROTECTION SYSTEM AND PROTECTION METHOD FOR POWER CONVERTERS

(71) Applicant: BAE Systems Controls Inc., Endicott, NY (US)

(72) Inventors: Andrew S. Clark, Binghamton, NY (US); Nicholas A. Lemberg, Endwell, NY (US); Joseph M. Dutko, Endwell, NY (US)

(73) Assignee: BAE Systems Controls Inc., Endicott, NY (US)

( * ) Notice: Subject to any disclaimer, the term of this patent is extended or adjusted under 35 U.S.C. 154(b) by 215 days.

(21) Appl. No.: 18/067,208

(22) Filed: Dec. 16, 2022

(65) Prior Publication Data
US 2024/0204506 A1 Jun. 20, 2024

(51) Int. Cl.
*H02J 9/06* (2006.01)
*B60R 16/03* (2006.01)
*H02H 7/12* (2006.01)

(52) U.S. Cl.
CPC ........... *H02H 7/1213* (2013.01); *B60R 16/03* (2013.01); *H02J 9/061* (2013.01)

(58) Field of Classification Search
CPC ........ H02H 7/1213; H02H 7/122; H02H 7/12; H02H 7/10; H02H 7/09; H02H 7/18;
(Continued)

(56) References Cited

U.S. PATENT DOCUMENTS

| 7,554,276 | B2 | 6/2009 | Galli et al. |
| 11,458,844 | B2 | 10/2022 | Takahashi |
| 2006/0250902 | A1 | 11/2006 | Bender et al. |
| 2013/0127383 | A1 | 5/2013 | Kawamura |

(Continued)

FOREIGN PATENT DOCUMENTS

WO 2022/061102 A1 3/2022

OTHER PUBLICATIONS

Emilio, M., "Flyback Switcher for Electric Vehicle Applications", online, Power Electronic News, searched on Nov. 30, 2022, internet <https://www.powerelectronicsnews.com/flyback-switcher-for-electric-vehicle-applications>, printed Nov. 30, 2022.
(Continued)

*Primary Examiner* — Nguyen Tran
(74) *Attorney, Agent, or Firm* — Scully Scott Murphy & Presser PC (57) ABSTRACT

Protection system and method for preventing damage to components in an inverter module caused by a permanent magnet (PM) electric machine being in an uncontrolled state is provided. The system has a back-up power supply to supply power to voltage rails for gate driver circuitry which controls at least one pair of semiconductor switches. At least one pair of semiconductor switches is electrically connected to the PM electric machine. The back-up power supply receives as input, a differential voltage of a DC bus. The protection system also has a control module electrically connected to the second power supply and receive power therefrom. The control module is configured to receive a sensed voltage of the DC bus and cause the gate driver circuitry to short respective phases when a differential voltage of the DC bus is greater than or equal to a first threshold and a condition is satisfied.

20 Claims, 8 Drawing Sheets

(58) Field of Classification Search
CPC .............. H02H 7/0838; B60R 16/03; B60R 16/0307; B60R 16/033; B60R 16/04; B60R 16/0232; H02J 9/061; H02J 9/06; H02J 9/04
See application file for complete search history.

(56) References Cited

U.S. PATENT DOCUMENTS

| | | | |
|---|---|---|---|
| 2016/0325777 A1* | 11/2016 | Mori | H02P 6/085 |
| 2019/0043664 A1 | 2/2019 | Hiyama | |
| 2020/0076347 A1 | 3/2020 | Chen et al. | |
| 2020/0398680 A1 | 12/2020 | Du et al. | |
| 2021/0006195 A1* | 1/2021 | Maeda | B60L 15/20 |
| 2021/0050799 A1 | 2/2021 | Ogura et al. | |
| 2021/0213834 A1* | 7/2021 | Kikuchi | B60L 3/04 |
| 2021/0288604 A1 | 9/2021 | Kondo et al. | |
| 2022/0097531 A1 | 3/2022 | Kim et al. | |
| 2022/0345060 A1 | 10/2022 | Hara et al. | |

OTHER PUBLICATIONS

Pinin, A., "Design a Switch Mode Power Supply Using an Isolated Flyback Topology", online, Digi-Key Electronics, searched on Nov. 30, 2022, internet <https://www.digikey.com/en/articles/design-switch-mode-power-supply-isolated-flyback-topology>, printed Nov. 30, 2022.

Texas Instruments, "Design Guide: TIDA-00173 400- to 690-V AC Input 50-W Flyback Isolated Power Supply Reference Design for Motor Drives", 2019, pp. 1-34.

Picard, J., "Under the Hood of Flyback SMPS Designs", 2010 Power Supply Design Seminar, pp. 1-41.

Ma, K. et al., "An integrated flyback converter for DC uninterruptible power supply," in IEEE Transactions on Power Electronics, Mar. 1996, pp. 318-327, vol. 11, No. 2.

International Search Report, PCT/US23/82479, mailed Apr. 15, 2024, 8 pages.

* cited by examiner

PROTECTION SYSTEM AND PROTECTION METHOD FOR POWER CONVERTERS

FIELD OF THE DISCLOSURE

This disclosure relates to power converters for vehicles such as battery electric vehicles and hybrid electric vehicles. More particularly, this disclosure relates to a protection system and method for preventing damage to components in an inverter caused by an electric machine being in an uncontrolled state.

BACKGROUND

Battery electric vehicles and hybrid electric vehicles have an electric machine such as a permanent magnetic electric machine electrically connected to an inverter. The electric machine is also mechanically connected to wheel axle(s) or turbine of the vehicle via a one or more mechanical connections.

A low voltage battery in the vehicle provides a first voltage. The first voltage is used to seed a primary or main power supply for the inverter. The main power supply generates a plurality of gate driver rails used to power two or more gate driver circuits to drive pairs of semiconductor switches. The pairs of semiconductor switches are connected in a half-bridge configuration between a high voltage DC bus (DC+ and DC−). The inverter may have one or more pairs of the semiconductor switches.

The low voltage battery is also used to seed a plurality of control power rails used to control the inverter. The inverter may also comprise a propulsion control unit such as a primary controller. The primary controller may receive torque and/or speed command(s) from another controller and generate commands to the gate driver circuitry. The torque and/or speed command(s) from this controller may be received via a communication interface, such as CAN. The control power rails provide power for the primary controller and the communication interface.

In normal operation and when the vehicle is ON, the primary controller and communication interface, receive the respective control power rails, which are in a predetermined range, and supplies the appropriate command to the gate driver circuits. The gate driver circuits, which are supplied with the gate driver rails, controls the gates of the semiconductors switches to turn ON/OFF to control the electric machine (a controlled state). But, when there is a malfunction or problem with one or more of the control power rails or the gate driver rails, the gates of the semiconductors switches may not be able to be properly controlled because either the communication interface may not be receiving the required power to transfer data, the primary controller may be not receiving power to receive the needed torque/speed command and issue a command to the gate driver circuits or the gate driver circuits may not be receiving the required power to operate and drive the gates of the semiconductor switches. This may lead to an uncontrolled state for the electric machine.

However, since the electric machine is still mechanically connected to the wheel axle or turbine, the electric machine is still rotating. In a case where the electric machine is a permanent magnet electric machine, the rotation causes a large amount of back EMF. Given, the speed of the permanent magnet electric machine can no longer be controlled, the amount of back EMF becomes proportional to the rotational speed of the wheel axle or the turbine. This in turn causes the voltage of the DC bus to have an uncontrollable increase. This increase may cause damage to the semiconductor switches and capacitors connected to the DC bus.

This problem may also exist when a vehicle is OFF while the wheel axle is still rotating such as during towing This is because when the vehicle is OFF, the low voltage battery cannot seed the control power rails, or the gate driver rails. However, since the electric machine is still mechanically connected to the wheel axle or turbine, the electric machine is still rotating causing the back EMF.

In some cases, when the electric machine is connected to the wheel axle via a drive shaft, prior to towing, the drive shaft is disconnected between the electric machine and the wheel axle to prevent the rotation of the electric machine based on the rotation of the wheel axle. However, disconnecting the drive shaft is difficult and time consuming.

In other vehicle systems, the electric machine is connected to a wheel axle without a drive shaft such as an e-axle. Therefore, the electric machine cannot be mechanically disconnected from the wheel axle during towing.

SUMMARY

Accordingly, disclosed is a system comprising a first power supply, a second power supply and a control module. The first power supply is configured to provide a plurality of voltage rails to gate driver circuitry. The gate driver circuitry is configured to control a plurality of pairs of semiconductor switches. Each pair of semiconductor switches are connected in a half-bridge configuration between a positive DC rail and a negative DC rail of a DC bus, The first power supply receives a first voltage generated from an external power source. The plurality of pairs of semiconductor switches are controlled to transfer phase power to and from a permanent magnet (PM) electric machine. The second power supply is configured to provide a back-up power to the plurality of voltage rails, The second power supply receives power from the DC bus. The control module is electrically connected to the second power supply and receives power therefrom. The control module is configured to receive a sensed voltage of the DC bus and cause the gate driver circuitry to short the respective phases when a differential voltage of the DC bus is greater than or equal to a first threshold and a condition is satisfied.

Certain components within the control module use power generated from the second power supply and others use power generated from the first voltage.

In an aspect of the disclosure, when the differential voltage of the DC bus decreases to a second threshold less than the first threshold after reaching the first threshold, the control module stops causing the gate driver circuity from shorting the respective phases. The second threshold may be greater than a voltage needed for powering the second power supply to provide the back-up power. In some aspects of the disclosure, the second threshold may be twice as much as the voltage needed for powering the second power supply to provide the back-up power. For example, the second threshold may be 100 V DC. In an aspect of the disclosure, the first threshold may be 400 V DC.

In an aspect of the disclosure, the system may be installed in a vehicle.

In an aspect of the disclosure, the control module may receive power from the second power supply when the external power source of the vehicle is OFF and the second power supply is functioning.

In an aspect of the disclosure, the condition is the first voltage being less than corresponding threshold voltage and the control module cause the gate driver circuitry to short the respective phases when the first voltage is less than the corresponding threshold voltage and the voltage of the DC bus is greater than or equal to the first threshold.

In an aspect of the disclosure, the gate driver circuitry is also powered by the second power supply via the plurality of voltage rails when the vehicle is OFF.

In an aspect of the disclosure, the PM electric machine may be connected to wheel axles such as via an e-axle or a drive shaft and a differential. The system may be used when the vehicle is being towed without disconnecting the drive shaft, e.g., while the drive shaft remains connected. When the vehicle is OFF, the external power source is also OFF, and the control module and the gate driver circuitry receive power from the second power supply such as when the vehicle is being towed.

In an aspect of the disclosure, the system is installed in inverter modules of a power system for a vehicle. The inverter module may output a single phase where multiple inverter modules may be connected to the same PM electric machine, such as three. When the control module in any of the inverter module causes the gate driver circuitry to short the respective phases, the control modules in the other inverter modules also cause the gate driver circuitry to short the respective phases.

In an aspect of the disclosure, the control module may comprise a first comparator configured for hysteresis. The first comparator may be configured to determine whether the voltage of the DC bus is greater than or equal to the first threshold or less than or equal to the second threshold. In an aspect of the disclosure, the voltage of the sensed DC bus is filtered, and the determination is based on the filtered sensed voltage of the DC bus. The control module may comprise a filter to filter the sensed voltage of the DC bus. The filter may be connected to a terminal of the first comparator. The filter sets a control response timing of the first comparator to changes in the sensed voltage of the DC bus. The filter may comprise capacitance and resistance, The control response timing is determined based on a combination of the capacitance and resistance. In an aspect of the disclosure, the system may be installed in an inverter module. The inverter module has capacitance connected to the DC bus. A DC bus voltage response timing is based on the capacitance connected to the DC bus and an inductance of a stator in the electric machine. In an aspect of the disclosure, the control response timing may be faster than the DC bus voltage response timing such as for example, at least twice as fast as the DC bus voltage response timing.

In an aspect of the disclosure, the control module may comprise multiple comparators such as at least a first comparator and a second comparator. The first comparator may be configured for hysteresis. The first comparator may be configured to determine whether the voltage of the DC bus is greater than or equal to the first threshold or less than or equal to the second threshold. The second comparator may be configured to determine whether a control power rail is missing or out of range. The second comparator may receive power generated from the first voltage. The control module may also comprise an AND gate and isolation, The isolation may be an optocoupler. The isolation may be connected to the second comparator and to the AND gate. The isolation may receive power generated from the first voltage and power generated from the second power supply.

In an aspect of the disclosure, when the power generated from the first voltage is not received by either of the second comparator or the isolation and when the voltage of the DC bus is greater than or equal to the first threshold, the AND gate outputs a signal to cause the gate driver circuitry to short the respective phases.

In an aspect of the disclosure, the inverter module may comprise a controller configured to issue a command to the gate driver circuitry and one or more communication interfaces configured to communicate with one or more controllers in the vehicle. The controller and the communication interface may receive power via one or more control power rails. In an aspect of the disclosure, when any voltage of the one or more control power rails is less than a set threshold for a corresponding voltage and the voltage of the DC bus is greater than or equal to the first threshold, the control module causes the gate driver circuitry to short the respective phases.

In an aspect of the disclosure, there may be N-phases such as three-phases.

In an aspect of the disclosure, the second power supply may comprise a DC/DC flyback converter connected to the DC bus.

In an aspect of the disclosure, the gate driver circuitry shorts the respective phases in response to a command from a system control unit of a vehicle external to an inverter module having the system. The system may be configured to confirm the shorting of the respective phases and issue a notification to the system control unit.

DETAILED DESCRIPTION

In accordance with aspects of the disclosure, an inverter module 100 has protection against damages from an uncontrolled state of a permanent magnet (PM) electric machine 115. A protection control module 50, in the inverter module 100, using power supplied by a back-up power supply 15, which is seeded by the DC bus 20, determines whether a shorting of different phases with respect to the windings of the PM electric machine (referred to as N Phase Short, where N is the number of phases supported by the inverter module 100) is needed based on a predetermined condition and the sensed voltage of the DC bus. When the protection control module 50 determines that the shorting is needed, the protection control module causes the gate driver circuitry 30 to short different phases with respect to the windings of the PM electric machine 115(e.g., turn all of the negative side semiconductor switches 602 ON at the same time, while all of the positive side semiconductor switches 600 are OFF). The gate driver circuitry 30 uses power from the back-up power supply 15 to control the gates of the semiconductor switches 600, 602. While in an N Phase Short, the protection control module 50 continues to monitor the sensed DC bus voltage using the power supplied by the back-up power supply 15. However, since the back-up power supply 15 is seeded by the DC bus 20, and the N Phase Short gradually reduces the DC bus voltage, the DC bus voltage may go below a voltage needed for seeding of the back-up power supply 15. During the protection, i.e., the N Phase Short, a high voltage energy storage system (ESS) normally connected to the DC bus 20 would be disconnected during a faulted system or unpowered system state. The high voltage energy storage system may be a battery. For example, when the vehicle is OFF, contactors between the ESS and the DC bus 20 may be in a default state such that the ESS is electrically isolated from the DC bus. Similarly, when there is a fault such as where control power rails missing or the control power rails are below corresponding thresholds, the ESS may be isolated via the contactors. Therefore, in accordance with aspects of the disclosure, prior to the DC bus voltage being reduced to below the voltage needed for seeding the back-up power supply 15, the protection control module 50 releases the N Phase Short so that the protection control module 50 may remain functional and receive the power from the back-up power supply 15 (i.e., maintains the back-up power supply 15 functioning).

Figure 1:
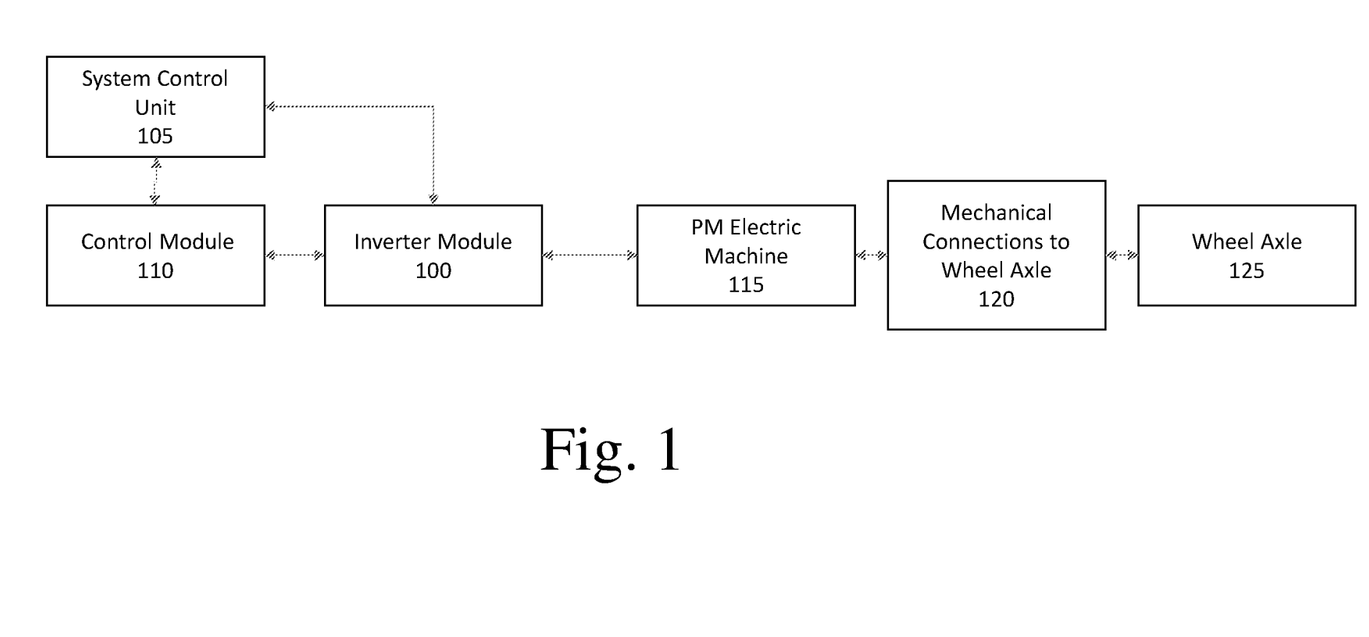
FIG. 1 illustrates an example of a vehicle system in accordance with aspects of the disclosure.

FIG. 1 illustrates an example of a vehicle system in accordance with aspects of the disclosure. The vehicle system may be used in hybrid electric vehicle (HEV) or a battery electric vehicle (BEV). The vehicle may be a personal vehicle, such as a scooter, car, motorcycle and truck or a commercial vehicle such as a truck or bus, a maritime vehicle such as a boat or submarine or a military vehicle such as a tank, self-propelled artillery, or troop transport. The vehicle may also be an airplane, helicopter, UAV, and other powered air vehicles.

The vehicle system may comprise a system control unit (SCU) 105, a control module 110, one or more inverter modules 100, one or more permanent magnetic (PM) electric machines 115, mechanical connections 120 and the wheel axles 125 (and wheels). In a case of airplanes, helicopters, UAVs and other powered air vehicles the PM electric machine may be connected to a turbine (or other propulsion mechanism) and not wheel axles.

In some aspects of the disclosure, the control module 110 and inverter modules 100 may be part of a modular power control system (MPCS). A MPCS is a modular line replaceable unit (LRU) containing a plurality of inverters modules and high voltage power distribution. The MPCS is scalable and customizable to have any number of inverter modules 100 and current interfaces. Different inverter modules may support and/or provide different phases of power.

The control module 110 may control one or more inverter modules 100. In an aspect of the disclosure, the control module 110 may comprise one or more processors, memory and a communication interface. The communication interface may be controller area network CAN. The processor may be an FPGA. In other aspects of the disclosure, the processor may be a microcontroller or microprocessor or any other processing hardware such as a CPU or GPU. Memory may be separate from the processor (as or integrated in the same). For example, the microcontroller or microprocessor includes at least one data storage device, such as, but not limited to, RAM, ROM and persistent storage. In an aspect of the disclosure, the processor may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

The communication interface may also be other network interfaces such as an ETHERNET, serial such as ARINC 429, 422, 485 interfaces or a wireless interface.

The MPCS may also comprise other modules not described herein.

The SCU 105 may also comprise a processor, memory and a communication interface. The SCU 105 communicates with the control module 110 and the inverter modules 100. The SCU 105 issues torque/speed commands to the control module 110 based on requests from an operator such as a driver of the vehicle via one or more inputs. The control module 110 receives these commands and generates corresponding control command for the respective inverter modules 100 and transfer the corresponding control commands to the inverter modules 100 such as via CAN.

The PM electric machine(s) 115 may be surface permanent magnet electric machines or interior permanent magnet electric machines.

The PM electric machine 115 may be connected to the wheel axle(s) 125 (or turbine) via one or more mechanical connections 120. For example, the PM electric machine 115 may be connected via a transmission, a drive shaft, and a differential. The transmission may include a single or multiple gears. In other aspects of the disclosure, the PM electric machine 115 may be included in an e-axle and the drive shaft may be omitted.

In some aspects of the disclosure, the inverter module(s) 100 and the PM electric machine(s) 115 may be connected via cables. In other aspects of the disclosure, the PM electric machine(s) 115 and the inverter module(s) may be integral.

Figure 2:
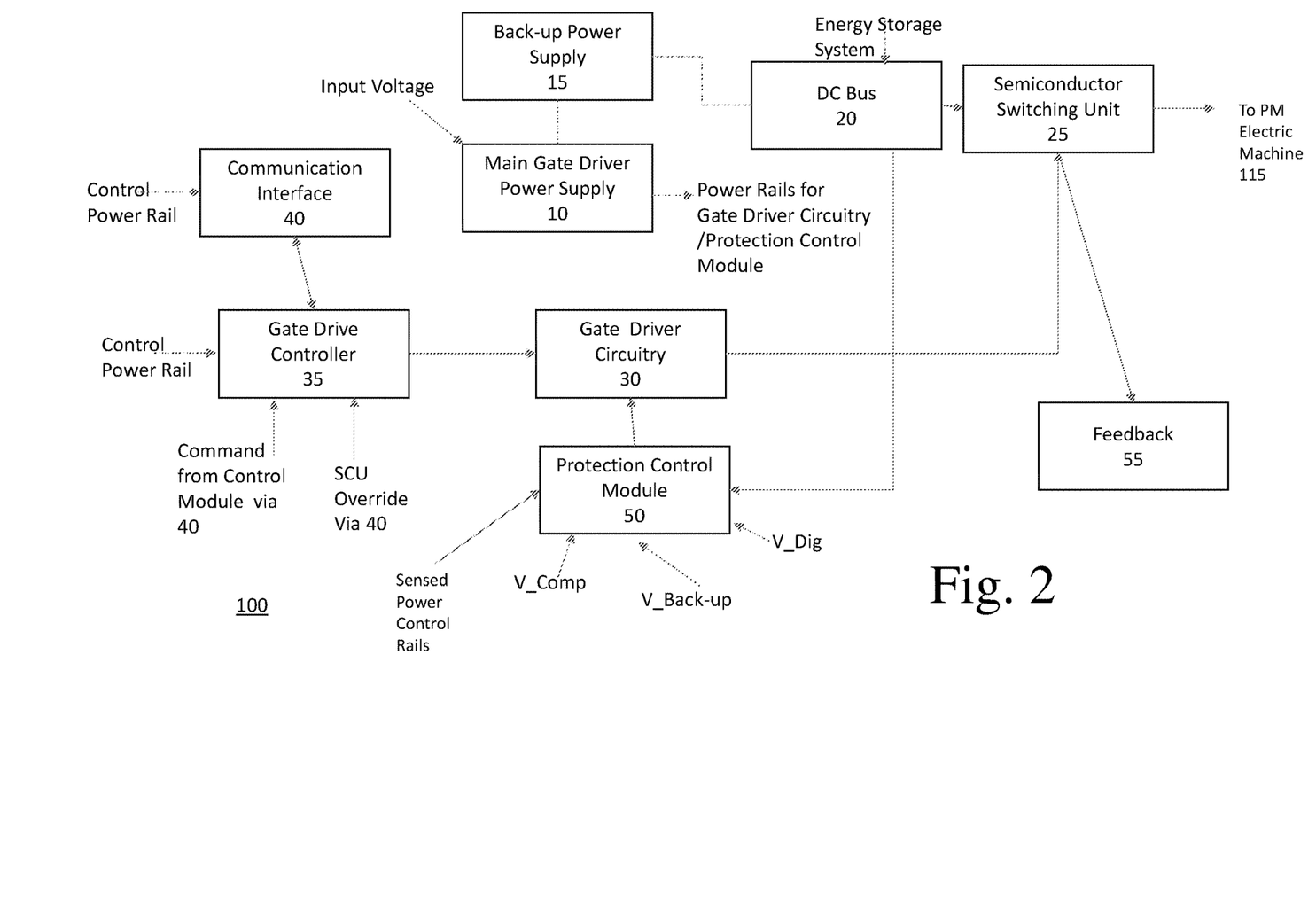
FIG. 2 illustrates an example of an inverter module with uncontrolled state protection in accordance with aspects of the disclosure.

FIG. 2 illustrates an example of an inverter module 100 with an uncontrolled state protection system in accordance with aspects of the disclosure. The inverter module 100 may comprise a main gate driver power supply 10, a back-up power supply 15, a DC bus 20, a semiconductor switching unit 25, gate driver circuitry 30, a gate drive controller 35 (primary controller), a communication interface 40, a protection control module 50 and feedback 55. An ESS may be connected to the DC bus 20 via contactors (not shown in the figures).

Figure 6:
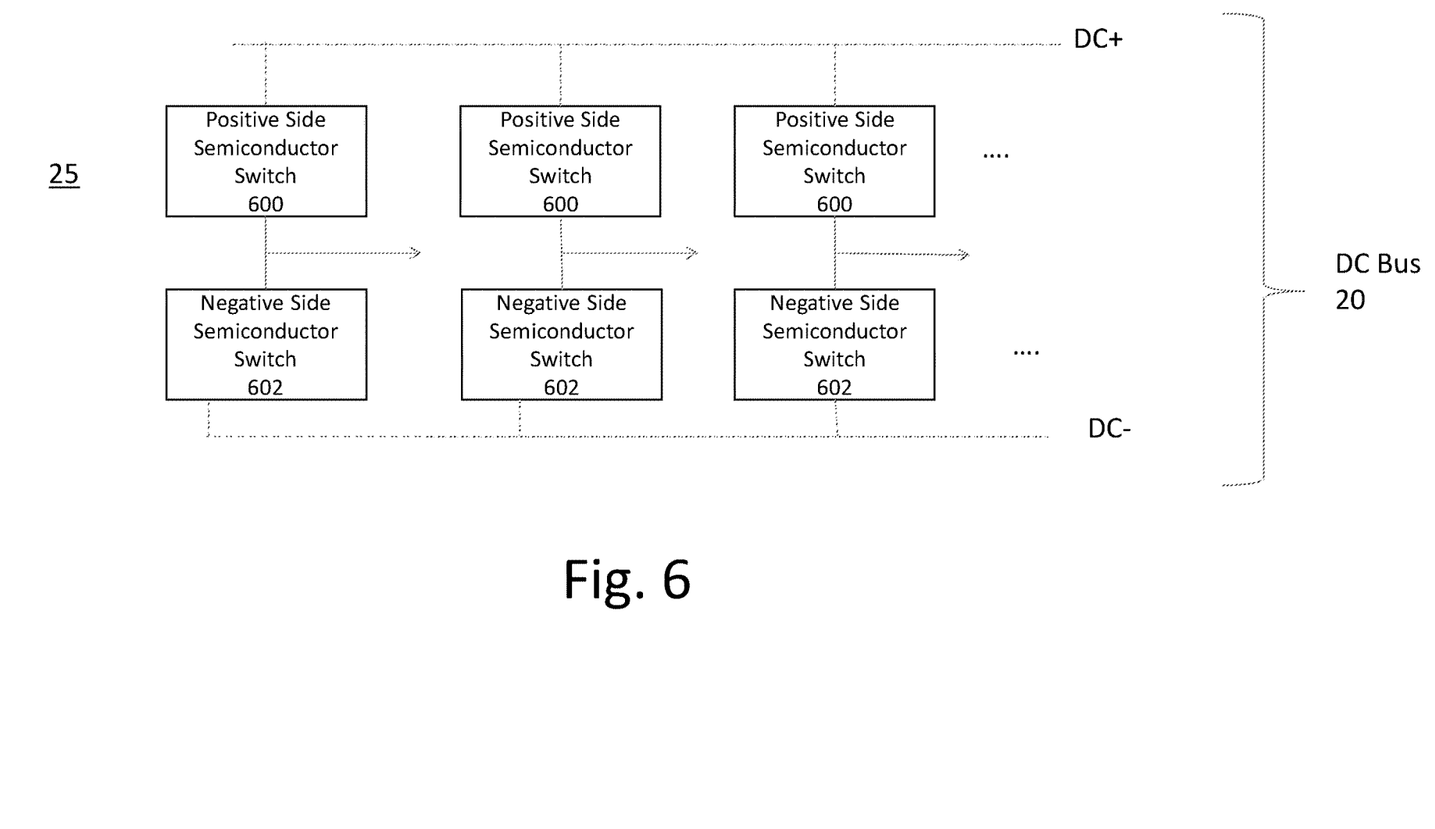
FIG. 6 illustrates an example of a semiconductor switching unit in accordance with aspects of the disclosure.

The semiconductor switching unit 25 comprises a plurality of pairs of semiconductor switches as illustrated in FIG. 6. Each pair of semiconductor switches 600, 602 is connected in a half-bridge configuration between a positive DC rail and a negative DC rail of a DC bus 20. The pairs of semiconductor switches comprise a positive side semiconductor switch 600 (connected to the positive rail DC+) also referred to herein as HIGH and the negative side semiconductor switch 602 (connected to the negative rail DC−) also referred to herein as LOW.

The number of pairs of semiconductor switches 600, 602 depends on the number of phases supported by the inverter module 100. For example, for an inverter module 100 supporting a single phase, there may be a single pair of semiconductor switches 600, 602. However, for an inverter module 100 supporting three-phases, there may be three pairs of switches 600, 602. Supporting used herein is different than outputting to an electric machine such as the PM electric machine 115. Multiple phases may be independently output to an electric machine. In other aspects, the phases may be connected in parallel such that one output is supplied (one terminal).

The semiconductor switches may be transistors such as Insulated-gate bipolar transistors (IGBT) or field effect transistors (FETS). For example, the FETs may be wide bandgap semiconductor such as, but not limited to, silicon carbide (SiC) or gallium nitride (GaN). The switching frequency of the semiconductor switches 600, 602 may be application specific and designed to achieve a target power.

The main gate driver power supply 10 is seeded by a low voltage power (identified in the figures as "Input Voltage"), supplied either directly or indirectly via an external low voltage battery. In the figures a dashed line into or out of a component such as the main gate driver power supply 10, back-up power supply 15, protection control module 50 refers to input or output voltage (rail). The solid lines between components refers to either physical connections, control signals (e.g., gate drive control 35 and gate driver circuitry 30 and semiconductor switching unit 25 or communication interface 40 and gate drive control 35) or sensed values, such as sensed voltages of a rail (e.g., control power rails or DC bus, feedback). The external low voltage battery may be a starting, lighting and ignition battery (SLI). The inverter module 100 may comprise a plurality of individual power circuits (not shown) for generating a plurality of control power rails including the seed voltage for the main gate driver power supply 10 (e.g., a Vboost) and rails for certain comparators 355 in the protection control module 50 (e.g., V_Comp) and for isolator(s) such as in an isolator 365 the protection control module 50 (e.g., V_Dig). Control power rails are power rails needed to regulate the speed/torque of the PM electric machine 115 or another electric machine. The number of power rails and the specific values are application specific based on the specific design of the circuitry with an inverter module 100. The control power rails may include a voltage(s) for the gate drive controller 35, a voltage for the communication interface 40, . . . etc. In some aspects of the disclosure, the SLI voltage may also be a control power rail. In some aspects of the disclosure, one of the individual power circuits may boost the SLI voltage to generate the input voltage of the main gate driver power supply (e.g., Vboost).

The main gate driver power supply 10 provides a plurality of power rail for the gate driver circuitry 30 (gate drive rails). In some aspects of the disclosure, there may be a plurality of the main gate driver power supply 10. The connections to and within the plurality of main gate driver power supplies may be based on the number of pairs of semiconductor switches 600, 602 and the configurations thereof. For example, when there are three sets of pairs, such as three phases, e.g., u, v, w, the pairs may be separately driven and independent or connected in parallel.

When the three sets of pairs are separately driven, there may be six independent and separate main gate driver power supplies, e.g., one per separately driven semiconductor switch. In other aspects, when the three sets of pairs are connected in parallel, there may be only two independent and separate supplies, three are connected and share current (LOW and HIGH).

The back-up power supply 15 is configured to receive power from the DC bus 20 and provide a back-up power supply to the plurality of gate drive rails and provide power to certain elements in the protection control module 50.

Figure 3:
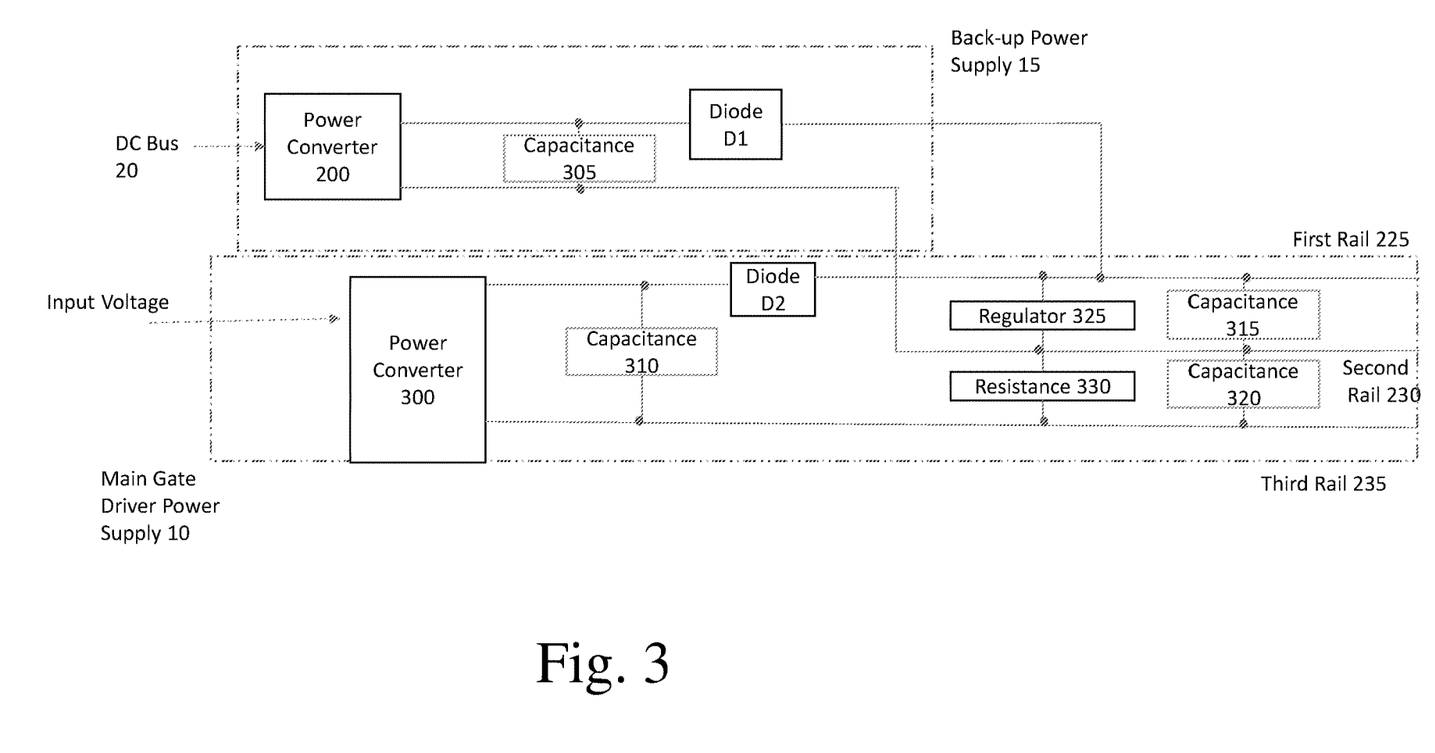
FIG. 3 illustrates an example of a main gate driver power supply and a back-up power supply for the inverter module in accordance with aspects of the disclosure.

FIG. 3 illustrates an example of a main gate driver power supply 10 (shown within dashed and two dotted lines) and a back-up power supply 15 (shown within dashed and single dotted lines) in accordance with aspects of the disclosure.

The main gate driver power supply 10 is seeded by a low voltage (input voltage). This input voltage may be an SLI voltage, or a voltage boost therefrom Vboost. The input voltage is applied to a power converter 300. The power converter may be an open loop peak charge converter with post-regulation. In some aspects of the disclosure, the power converter 300 may comprise a transformer, rectifiers, filters, capacitance and a linear regulator. For example, the transformer may be a planar transformer having a single primary side coil and multiple secondary side coil Ms, where M is based on the number of pairs semiconductor switches as described above. For example, M may be 6 (three pairs). However, in other aspects, multiple different transformers may be used, one per, each separate and independent power supply.

The power converter 300 outputs a preset voltage V across capacitance 310. The preset voltage V may be further regulated to provide target gate drive rails such as using a regulator 325, resistance 330 and capacitance 315, 320. In an aspect of the disclosure, there may three rails The values of the specific rails: first rail 225, second rail 230 and third rail 235 are set by the voltage regulator 325 and resistance 330. The voltage regulator 220 may be a precision shunt regulator which is adjustable to customize the rails 225, 230, 235 (gate drive rails) as needed.

The specific values of the gate drive rails 225, 230, 235 may be based on the gate driver circuitry. In some aspects of the disclosure, the second rail 230 may provide a reference such that when the first rail 225 is referred to in the following description it is the voltage between the first rail 225 and the second rail 230 (difference) (HIGH) and when the third rail 235 is referred to in the following description is it the voltage between the third rail 235 and the second rail 230 (difference) (LOW). The separate rails 225, 230, 235 are maintained by capacitance 315, 320 such as capacitance 315 between the first rail 225 and the second rail 230 and capacitance 30 between the second rail 230 and the third rail 235. In some aspects of the disclosure, the first rail 225 and third rail 235 are set to hard drive the gates of the semiconductor switches 600, 602.

The back-up power supply 15 comprises a power converter 200, capacitance (sized for xV) and a diode D1. The back-up power supply 15 is configured to receive a seed voltage from the DC bus 20. The back-up power supply 15 requires a minimum voltage to function. The back-up power supply 15 is also rated for a maximum voltage. In some aspects of the disclosure, the range is 50V to 1200V. In other aspects, the range may be from 75V to 800V.

In some aspects of the disclosure, the power converter 200 may be a DC-DC flyback converter. The flyback converter provide isolation between the DC bus 20 (input) and the output back-up x V. The flyback converter provides a step-down to the target voltage x V for the back-up. The power converter 200 is not limited to a flyback converter and other converter topologies may be used. The power converter 200 provides a target voltage x V. The value of x may be application specific and based on the main gate driver power supply 10. In an aspect of the disclosure, the value of x is set to be less than the voltage of the first rail 225. This is because under normal operation (no fault or malfunction), the first rail 225 should be provided or generated by the main gate driver power supply 10 and not the back-up power supply 15. For example, if the nominal voltage of the first rail is about 15 V, x may be about 14 V.

The back-up power supply 15 may also comprise a diode D1 which acts to ensure that the first rail 225 (and second rail 230, third rail 235) is only supplied by the back-up power supply 15 when the main gate driver power supply 10 is malfunctioning (e.g., is down) (in conjunction with diode D2 in the main gate driver power supply 10. The diode D1 may be a low voltage Schottky diode which acts as a "or". When the main gate driver power supply 10 is present, the first rail 225 is higher than the x V, thus the diode D1 is in a blocking state. However, when the main gate driver power supply 10 is not present, the diode D1 is conducting. The diode D2 prevent reverse current flow into the power converter 300 under a fault condition such as when the input voltage is missing and the back-up power supply 15 powers the rails 225, 230, 235 via the diode D1. For example, when D1 is conducting, diode D2 is reverse biased and does not conduct. In normal operation, the diode D2 is forward biased and is in a conductive state.

Certain components of the protection control module 50 uses power from the back-up power supply 15 (e.g., x V) (such as power generated from the x V). The same or additional power conversion circuits as described above may use the power (voltage) from the back-up power supply to generate voltages needed for the protection control module (collectively referred to as V_back-up). In an aspect of the disclosure, V_back-up make be the same for each component (that is connected to a voltage generated from the back-up power supply) in the protection control module 50. However, in other aspects, different components in the protection control module 50 may use different V_back-up values. The protection control module 50 is configured to determine when and if the N Phase Short is required and when and if the N Phase Short is to be stopped.

The protection control module 50 causes the N Phase Short when the sensed voltage on the DC bus 20 is equal to or larger than a first threshold and if any of the control power rails are out of normal range (or missing) including V_Comp and V_Dig. Both determinations are required to cause the N Phase Short. The first threshold is set to be higher than the voltage required for the back-up power supply 15 to function and low enough such that the components connected to the DC bus 20 connected to the DC bus 20 are not damaged. These components include the semiconductor switches 600, 602, capacitors and voltage sensors. Thus, the first threshold may be a function of the nominal DC bus value, the capacitor ratings, the semiconductor switch ratings, and the sensor rating. For example, the first threshold may be about 400V.

In an aspect of the disclosure, even though the control power rails may be out of range (or missing), the protection control module 50 may stop the N Phase Short when the voltage of the DC bus 20 becomes less than (or equal to) a second threshold. This is because the protection control module 50 functions based on the power (voltage) received from the back-up power supply 15 and the back-up power supply 15 is seeded with the voltage of the DC bus 20. If that voltage becomes too low, then the back-up power supply 15 may not function and the protection control module 50 would not be able to function and maintain control such as the N Phase Short. The second threshold may be based on the minimum voltage required for the back-up power supply 15. For example, the second threshold may be double the minimum voltage required. In some aspects of the disclosure, the second threshold may be 100 V. In other aspects of the disclosure, the threshold may be 150 V. In an aspect of the disclosure, the first threshold may also be based on the second threshold and a goal of not starting and stopping the N Phase Short repeatedly over a short period of time.

Figure 4:
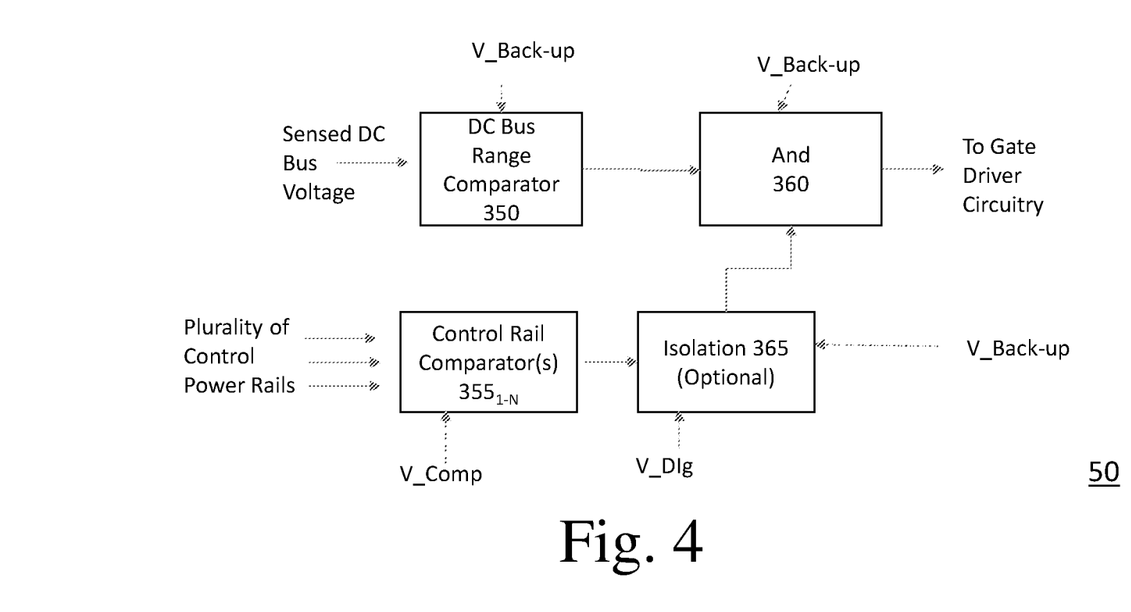
FIG. 4 illustrates an example of a protection control module in accordance with aspects of the disclosure.

FIG. 4 illustrates an example of the protection control module 50 in accordance with aspects of the disclosure. The protection control module 50 may comprise a plurality of comparators. For example, one of the comparators may be for high voltage, e.g., used for a DC bus 20 comparison, e.g., comparator 350 and the others may be used for comparing a plurality of control power rails with their normal ranges, e.g., comparators $355_{1-N}$.

In an aspect of the disclosure, the comparators $355_{1-N}$ are powered by V_Comp (generated from the lower voltage input such as the SLI input).

In an aspect of the disclosure, the DC bus comparator 350 is configured to receive a sensed differential voltage of the DC bus 20. For example, the protection system may further comprise a voltage sensor for sensing the voltage of the DC bus 20. The voltage sensor may sense the voltage and output a signal proportional to the sensed voltage. In an aspect of the disclosure, voltage sensors may be on both the DC+ and DC−. In an aspect of the disclosure, a single comparator 350 may be used as the comparator 350. This comparator 350 may be configured as a hysteresis comparator. In other aspects, two different comparators may be used: a first comparator for the first threshold and a second comparator for the second threshold.

In an aspect of the disclosure, the sensed voltage may be filtered by a timing control filter 400 to control the response timing of the comparator 350.

Figure 5:
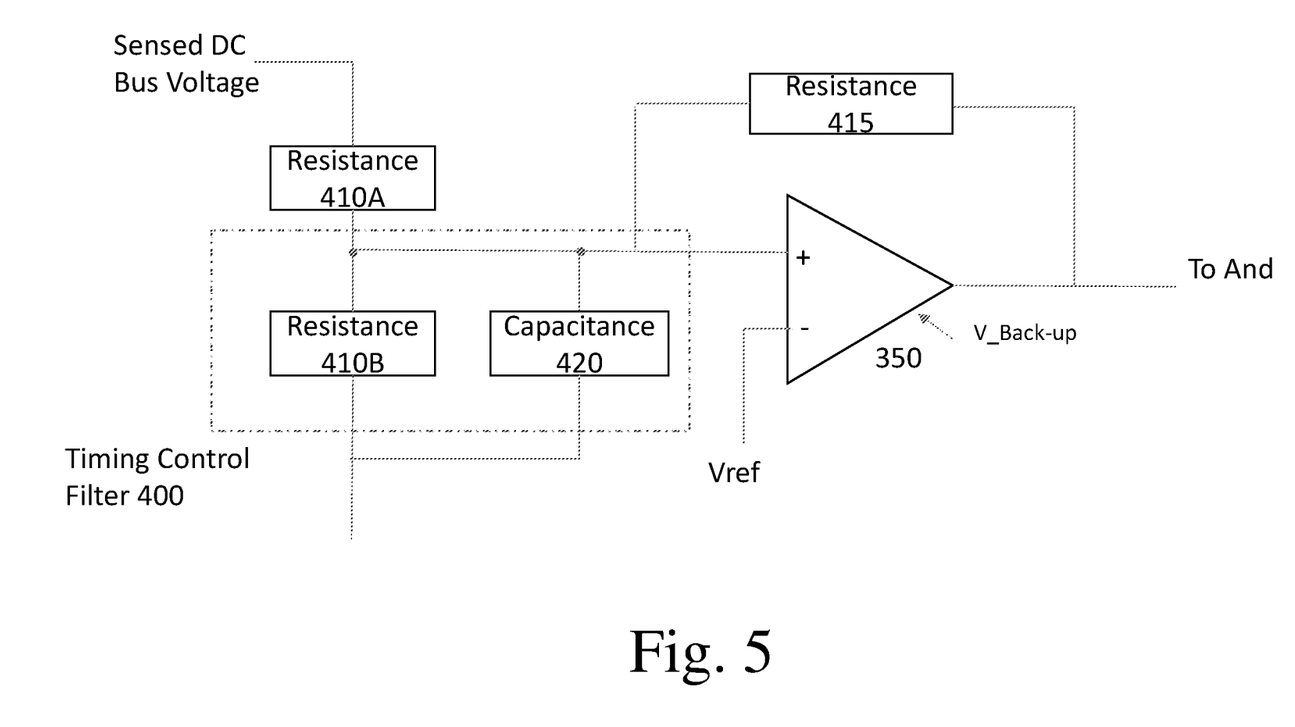
FIG. 5 illustrates an example of a hysteresis comparator and input filter for the protection control module in accordance with aspects of the disclosure.

FIG. 5 illustrates an example of a hysteresis comparator 350 and input filter (timing control filter) 400 for DC bus sensing in accordance with aspects of the disclosure.

The reference terminal may be the negative terminal of the comparator 350. A reference Vref may be directly or indirectly connected to the negative terminal of the comparator 350. In an aspect of the disclosure, the reference Vref may be chassis ground. In another aspect of the disclosure, the reference Vref may be based on a voltage of the second rail 230. In some aspects of the disclosure, the Vref may be based on another voltage generated from the back-up power supply (V_back-up). The hysteresis may be provided by resistance 415.

The sensed differential DC bus voltage is connected to the positive terminal of the comparator 350 via resistance 410A, 410B and capacitance 420. Resistance 410A is connected in parallel to resistance 410B (and resistance 415) Each resistance 410A, 410B and 415 may be provided by one or more resistors. For example, resistance 410A may be provided by a plurality of resistors connected in series. The number of resistors and specific values (including current rating) may be application specific and based on the nominal DC bus values. In an aspect of the disclosure, resistance 410A may be orders of magnitude larger than resistance 410B.

The resistance 410B and the capacitance 420 determine the response timing of the comparator 350 to changes of voltage in the DC bus 20 (e.g., a timing control filter 400). While resistance 410A also impacts the response timing of the comparator 350 to changes of the voltage in the DC bus 20, since the resistances are connected in parallel and the resistance 410A may be orders of magnitude larger than resistance 410B, the resistance 410B dominates the effective resistance. The resistance 415 may also be larger than the resistance 410B. While resistance 415 also impacts the response timing of the comparator 350, the effective resistance may still be dominated by the resistance 410B based on the relative value. Therefore, the timing control filter 400 is identified in FIG. 5 as comprising resistance 410B and capacitance 420. The timing control filter 400 is shown in a dashed and single dot box. The DC bus 20 moves according to the switching frequency of the semiconductor switches 600, 602. However, the DC bus 20 has a rise and fall time (rate) based on the capacitance on the DC bus and the inductance of the windings in the PM electric machine 115 (LC resonant circuit between the stator winding and the DC bus capacitor bank).

The rise/fall time t may be characterized as follows:

$$t = \frac{\arcsin\left(\frac{\text{Max survivable DC bus V}}{\text{Max DC bus V}}\right) - \arcsin\left(\frac{\text{DC bus V initial}}{\text{Max DC bus V}}\right)}{2\pi * fr} \quad (1)$$

$$\text{where } fr = \frac{1}{\sqrt{LC}}. \quad (2)$$

L is the stator inductance and C is the DC bus capacitance. MaxDCbusV is the peak voltage the DC bus 20 will charge to with energy transfer. The MaxsurvivableDCbus V is the maximum voltage rating of the circuitry. DCbusVinitial is the initial DC bus voltage.

$$\text{Max DC bus } V = \sqrt{2\frac{\text{Motor } L \text{ Energy} + C \text{ Energy}}{C}} \quad (3)$$

$$\text{where Motor } L \text{ Energy} = 0.5L * PC^2, \quad (4)$$

PC is peak current in the PM electric machine and where $$C \text{ Energy} == 0.5C * \text{DC bus V initial}^2 \quad (5)$$

The response timing of the comparator 350 is less than t. In an aspect of the disclosure, the response timing of the comparator 350 may be 3 times less than t. In other aspects, the response timing of the comparator may be 2 times less than t.

As described above, the comparators 355 may receive power generated from the low voltage side (SLI input power), e.g., V_Comp. In some aspects of the disclosure, the V_Comp may be indirectly generated by the SLI input power such as being generated from Vboost. When this rail faults or is missing, the comparators 355 may not function and output a value. In accordance with aspects of the disclosure, when this occurs, a portion of the protection control module 50 may default to a fault condition.

In an aspect of the disclosure, each control power rail comparator $355_{1-N}$ may be set with a different comparison threshold. For example, one of the comparators $355_1$ may be set with a threshold about the SLI voltage. Another comparator $355_2$ may be set with a threshold about the input voltage to main gate driver power supply (e.g., Vboost). Other comparators $355_3$ or $355_4$ may be set with thresholds about the control power rail(s) for the gate drive control 35. Another comparator $355_5$ may be set with a threshold about the control power rail for the communication interface 40, etc. . . .

Each of these comparators $355_{1-N}$ are connected to a reference Vref. Vref may be the same as described above.

In an aspect of the disclosure, the threshold for each of the comparator $355_{1-N}$ may be set to a minimum acceptable value for the specific voltage. In other aspects of the disclosure, each control power rail may have two comparators one set to a minimum acceptable value for the specific voltage and another set to a maximum acceptable value for the specific voltage (to provide a range) for over/under voltage protection.

In an aspect of the disclosure, since the comparators $355_{1-N}$ are on the low voltage side of the system and the comparator 350 is on a high voltage side of the system, there may be isolation 365 between the comparators $355_{1-N}$ and the high voltage side. High voltage side refers to components connected to the DC bus 20 and a ground defined by DC− of the DC bus 20. Low voltage side refers to components connected directly or indirectly to the low voltage input (such as the SLI voltage). The isolation 365 may be provided by an optical isolator such as an optocoupler. The isolation is not limited to an optocoupler, and other forms of isolation may be used such as a transformer, isolated solid-state relay or a digital isolator.

The isolation 365 is connected to power from both sides. For example, the isolation 365 may be connected to a rail generated from the low voltage input such as the SLI voltage (V_Dig). The isolation 365 may also be connected to a rail generated from the back-up power supply 15 (V_back-up). This V_back-up may be the same value as the voltage connected to the DC bus range comparator 350. When the isolation 365 is an optocoupler, the V_Dig forward bias the diode in the optocoupler such that it is in a conductive state and the optocoupler outputs a value based on input generated by the comparators 355. However, when the V_Dig is missing, the diode in the optocoupler is not forward bias and may be in a blocking state. Thus, the output from the optocoupler is not based on input generated by the comparators. A default value may input into the AND logic 360. This default value indicates a fault state.

The protection control module 50 may also comprise AND logic 360 such as an AND gate. The AND logic 360 will only output an override or a control signal to cause a N Phase Short when both outputs from the comparators 350/355 are HIGH, e.g., when the DC bus voltage is above the first threshold and one or more of the control power rails including SLI, Vboost . . . , is out of range (or missing) or when V_Comp or V_Dig is missing and a default value is input to the AND logic 360.

The gate drive controller 35 may also comprise a processor similar to described above, such as a FPGA. The gate drive controller 35 may receive a control command from the control module 110 (via the communication interface 40). The gate drive controller 35 may also receive an override from the SCU 105 (via the communication interface 40). The override may be based on an error upstream of the inverter module 100. For example, the SCU 105 may be alerted to a malfunction in the PM electric machine 115, an error in another module in the MPCS and issue a command to the gate drive controller 35 to cause the N Phase Short.

In an aspect of the disclosure, the gate drive controller 35 may also comprise shoot through protection. The shoot through protection prevents both semiconductor switches 600, 602 in the same pair to be ON at the same time (have the same state at the same time). The gate driver controller 35 may further comprises one or more buffers. The buffers may be a tri-state buffer. The tri-state buffer is configured to enable the SCU 105 to issue the above override. The gate drive controller 35 may also comprise a pull-up/pull down device. The pull-up/pull down device sets the state for the gate driver circuitry such as for a N Phase Short or N Phase Open for the different semiconductor switches 600, 602, respectively. A normal control path within the gate drive controller 35 between the gate drive controller 35 and the gate driver circuitry is bypassed.

Figure 7:
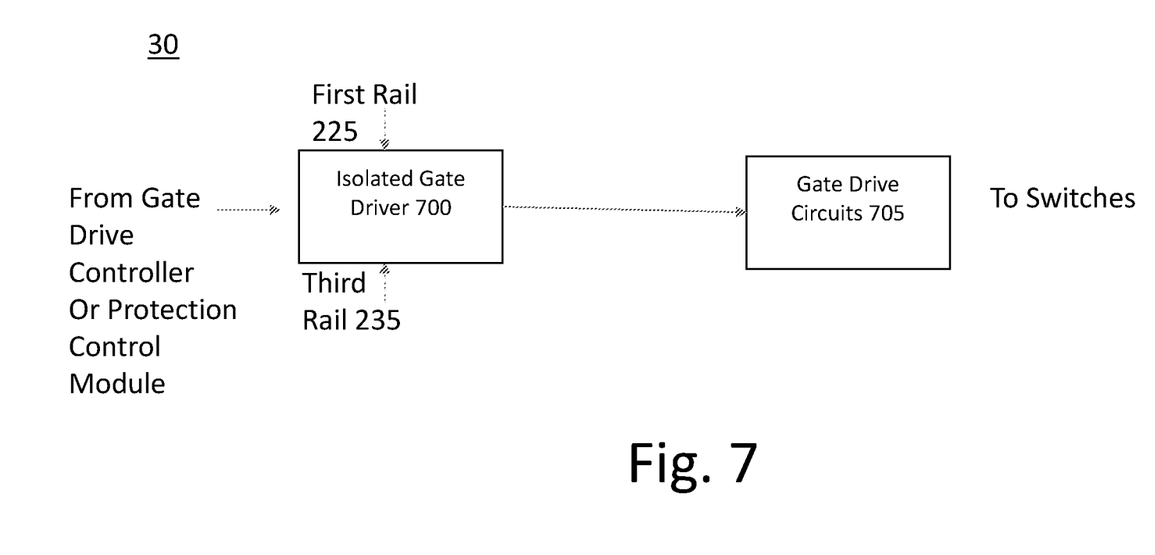
FIG. 7 illustrates an example of gate driver circuitry in accordance with aspects of the disclosure.

FIG. 7 illustrates an example of the gate driver circuitry 30 in accordance with aspects of the disclosure. The gate driver circuitry 30 may comprise an isolated gate driver 700 and gate circuits 705. The isolated gate driver 700 receives power from the main gate driver power supply 10 via the respective gate drive rails such as 225, 235 when the main gate driver power supply 10 is present. However, when the main gate driver power supply 10 fails (not present), the isolated gate driver 700 functions using the respective rails supplied by the back-up power supply 15.

The isolated gate driver 700 receives input from a plurality of control paths. A primary control path is from the gate drive controller 35 (normal operation). This primary control path includes switching commands generated based on the command(s) received from the control module 110. Another control path via the gate drive controller 35 is for an override from the SCU 105 (if upstream malfunction). A secondary control path is from the protection control module 50 to override the command in the primary control path and in some aspects, directly from the SCU.

The isolated gate driver 700 may be a galvanically isolated single gate driver. The circuitry 30 may have one isolated gate driver 700 for each switch 600, 602. As described above, the pairs of semiconductor switches 600, 602 may be independently driven or connected in parallel. For a three-phase supported semiconductor switches units (3 pairs of semiconductor switches 600, 602), there may be 6 independent isolated gate driver 700. When the three-phase supported semiconductor switches units (3 pairs of semiconductor switches are parallelly connected, there may be only two isolated gate drivers 700 one for the HIGH semiconductor switches 600 and one for the LOW semiconductor switches 602). The gate drive circuits 705 may be different depending on the configuration: independent or paralleled. In some aspects of the disclosure, the gate drive circuits 705 may include protection such as differential mode protection, transistor, resistor networks, current sharing, current boost, etc. . . .

In an aspect of the disclosure, the voltage of each phase relative to the negative DC bus (DC−) may be monitored, e.g., Vfeedback. The monitoring of the voltages may be used to confirm the N Phase Short. In some aspects of the disclosure, one or more comparators may be used to confirm the N Phase Short. In some aspects of the disclosure, the comparators may determine whether the voltages of all the phases are the same (e.g., Vshort_circuit). In an aspect of the disclosure, the number of comparators used may be the same as the number of pairs of switches 600, 602. For example, three comparators may be used for a three-phase supported inverter module 100. In an aspect of the disclosure, these comparators may also be supplied power using the back-up power supply 15. The same reference Vref described above may be used. When all the Vfeedbacks are equal to V_short_circuit, the comparator output HIGH signals, which may be input to an AND gate to output the confirmation.

In an aspect of the disclosure, the confirmation may be transmitted to the SCU 105. In this aspect of the disclosure, the feedback path may also have isolation. The isolation may be a digital isolation. Other forms of isolation such as described above may be used and the isolation is not limited to digital isolation. The digital isolators may be between the AND gate (on the high voltage side) and one or more buffers (on the low voltage side). The buffers may be tri-state buffers. In some aspects of the disclosure, whether the confirmation is sent to the SCU 105 may be enabled/disabled by the SCU 105 via a control signal to the tri-state buffer.

The protection control module 50 operates both when the vehicle is ON under "normal operation", where torque/speed command are received indirectly from the SCU 105 via the control module 110 and when the vehicle is OFF, such as when the vehicle is being towed. The functionality of the protection control module 50 is the same under both conditions.

Figure 8:
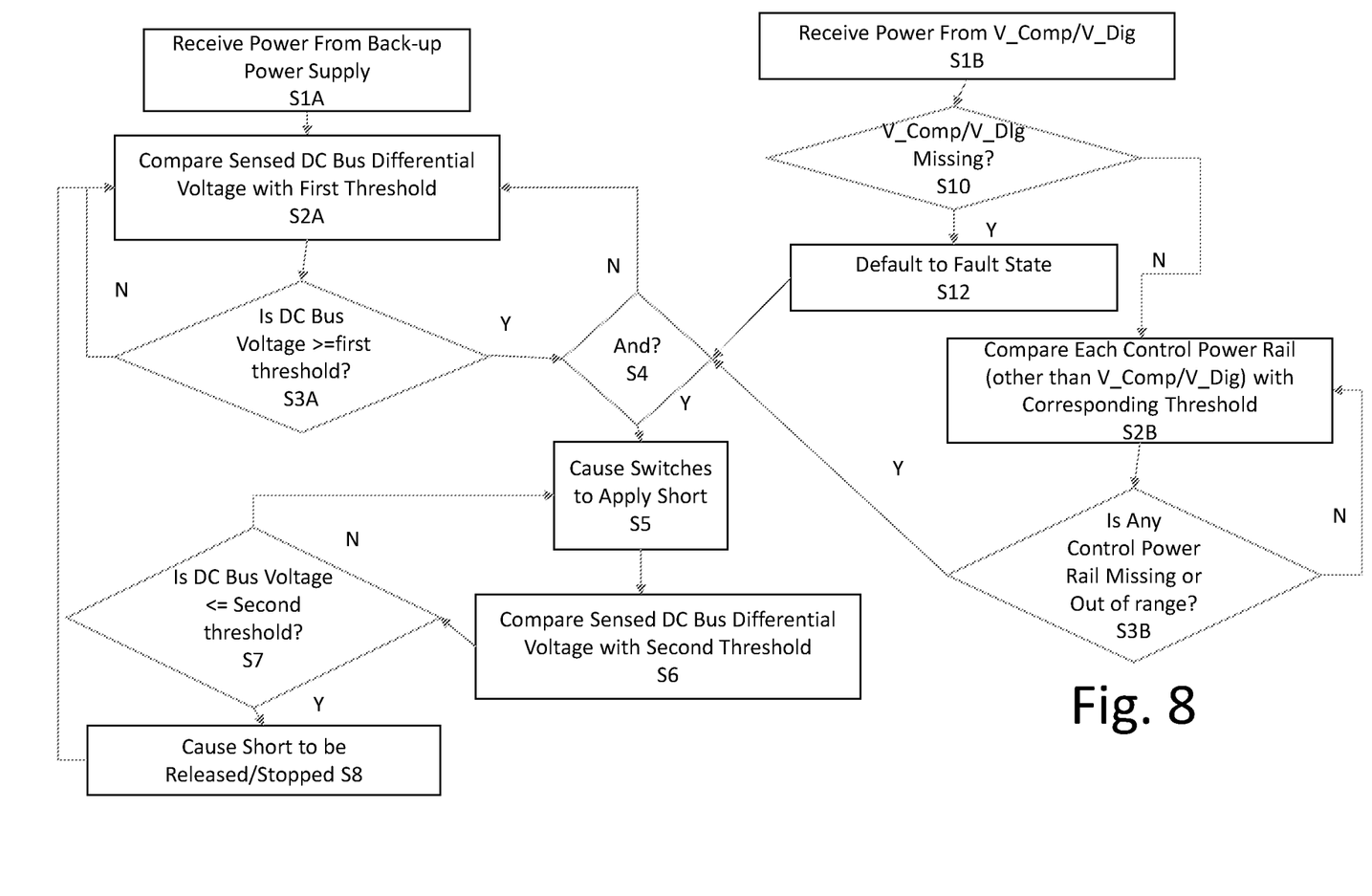
FIG. 8 illustrates a protection method in accordance with aspects of the disclosure.

FIG. 8 illustrates a method for protecting the inverter module 100 from damage from an uncontrolled state of a PM electric machine 115 executed by the protection control module 50 in accordance with aspects of the disclosure.

At S1A, certain components, such as the DC bus range comparator 350, isolation 365 and the AND 360 within the protection control module 50 are sourced with power (voltage) from the back-up power supply 15 (V_back-up). This power (voltage) enables the comparators 350, isolation 365 and AND 360 to operate. At S1B, the comparators 355 receive power (V_Comp) and the low voltage side of the isolation receives V_Dig, both generated directly or indirectly from a low voltage input (such as SLI) to the inverter module 100. At S2A, the comparator 350 compares the sensed differential voltage of the DC bus 20 with a first threshold, e.g., 400V. At the same time at S2B, each comparator $355_{1-N}$ compares a sensed voltage on a control power rail, such as Vsli, Vboost, voltage for the gate drive controller 35 and a voltage for the communication interface 40 with corresponding thresholds. The voltage of the DC bus 20 and control power rails may be continuously sensed by voltage sensors.

Additionally, at S10, it is determined whether either the V_Comp or V_Dig is missing (e.g., can the optocoupler be forward biased) and can the comparators 355 operated. When each voltage (V_Comp or V_Dig) are missed, either of the comparators 355 and isolation operator properly and the module 50 enters a default state of a fault at S12. For example, since the optocoupler is not forward bias by in a blocking state, the input into the AND 260 is a HIGH signal representing a fault condition. If V_Comp or V_Dig are both present ("N" at S10), the comparator 355 may output a signal based on a respective comparison at S3B and the isolation 365 may relay to the AND logic 360 a signal generated based on the output from the comparators 355.

Based on the comparison, at S3A, the comparator 350 determines whether the differential voltage of the DC bus is greater than or equal to the first threshold and output a signal to the AND logic 360 based on the comparison. Also, based on the respective comparisons, at S3B, each comparator $355_{1-N}$ determines whether the sensed voltage of the respective control power rail with within range or missing. When the sensed differential voltage of the DC bus 20 is less than the first threshold ("N" at S3A), the process returns to S2A for repeated comparison. Similarly, when all the control power rails are present and within range ("N" at S3B), the process returns to S2B for repeated comparison and returns to S10.

At S4, the AND logic 360 (such as an AND gate) determines whether both, the differential voltage of the DC bus 20 is greater than or equal to the first threshold and any of the control power rails are missing or are out of range (or default to fault state due to V_Comp/V_Dig), e.g., HIGH OUTPUTs received. When both are true ("Y" at S4), a control signal (such as a HIGH signal) is output to the isolated gate driver(s) 700 at S5. At this time, the isolated gate driver 700 may be receiving its power (voltage) via the back-up power supply 15. The control signal is an override signal for any command from the gate drive controller 35 (. The override signal causes the N Phase Short. For example, the negative side semiconductor switches 602 in each pair of semiconductor switches (for all phases), are controlled to be ON at the same time. The positive side semiconductor switches 600 in each pair of semiconductor switches (for all phases) are controlled to be OFF at the same time. The way the semiconductor switches 600, 602 are driven to be in the N Phase Short may be based on the configuration such as independently controlled or parallel control as described above. In an aspect of the disclosure, when the output is connected in parallel (parallel control), multiple single-phase out inverter modules are connected to the same PM electric machine 115. In this case, if one of the inverter modules connected to the PM electric machine 115 declares and causes the N Phase Short, the other inverter modules connected to the same PM electric machine also cause the N Phase Short. In some aspects of the disclosure, inverter modules 100 connected to the same PM electric machine 115 communicate with each other via CAN such as whether the N Phase Short is caused. In response to receipt of a signal from another inverter module 100 connected to the same PM electric machine 115, the protection control module 50 of each of the other inverter module 100 (connected to the same PM electric machine 115), cause the N Phase Short regardless of an internal malfunction (such as missing control power rails internally).

The N Phase Short causes the observed back EMF voltage in the PM electric machine 115 to reduce to zero voltage and prevents the machine from charging the DC Bus 20. Since there is a fault state in the inverter module 100, any connection between the DC bus 20 and the ESS may be opened such as via contactors. Since the ESS is not connected to the DC bus and any back EMF is isolated, the differential voltage of the DC bus 20 gradually reduces or bleeds down.

The voltage of the DC bus 20 is continuously monitored by voltage sensors.

At S6, the comparator 350 compares the sensed differential voltage of the DC bus 20 with a second threshold, e.g., 100V. This is because certain components within the protection control module 50 receives power (voltage) from the back-up power supply 15 and the power (voltage) for the back-up power supply 15 is seeded by the differential voltage of the DC bus 20 and if the differential voltage of the DC bus 20 goes below a voltage required for the back-up power supply 15 to function., these components within the protection control module 50 would also not function.

Based on the comparison, at S6, the comparator 350 determines whether the differential voltage of the DC bus 20 is less than or equal to the second threshold and output a signal to the AND logic 360 based on the comparison at S7. When the voltage of the DC bus 20 is less than or equal to the second threshold ("Y" at S7), the value of this signal is different from when the voltage of the DC bus 20 is greater than or equal to the first threshold. This causes the AND logic 360 to stop outputting the override signal to the isolated gate driver 700 and the N Phase Short is released at S8.

The semiconductor switches 600, 602 may then be controlled based on any command issued by the gate drive controller 35 (if the vehicle is ON). The control of the semiconductor switches 600, 602 by the gate drive controller 35 may increase the differential voltage of the DC bus 20 (as a result of the back EMF again not being isolated). If the vehicle is OFF and the wheel axle 125 are still rotating such as when towing, DC bus 20 is exposed to the back EMF of the PM electric machine 115. This will cause the voltage of the DC bus 20 to rise.

The voltage of the DC bus 20 is still being monitored and compared with the first threshold by the comparator 350 at S2A (the process returns from S8 to S2A). When the voltage of the DC bus 20 rises back to the first threshold ("Y" at S3A), the N Phase Short is reinstated (if still "Y" at S3B) or Y at S10. The shorting S5 and releasing/stopping S8 may be repeated as necessary to protect the inverter module 100 from damage from an uncontrolled state of the PM electric machine 115.

This repetition of the shorting S6 and releasing/stopping S8 is particularly needed if the vehicle is being towed for a lengthy period of time, where if the N Phase Short is not released, the protection control module 50 would not function correctly and the isolated gate driver 700 would not function (the rails 225, 235 from the back-up power source 15 would not be provided).

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include ±/0.1, 0.2, 0.3, etc., where the difference between the stated number may be larger when the state number is larger. For example, about 1.5 may include 1.2-1.8, where about 20, may include 18.0-22.0.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat. "Substantially" when referring to a shape or size may account for manufacturing where a perfect shapes, such as circular or sizes may be difficult to manufacture.

As used herein terms such as "a", "an" and "the" are not intended to refer to only a singular entity, but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

For purposes of the description hereinafter, the terms "upper", "lower", "right", "left", "vertical", "horizontal", "top", "bottom", and derivatives thereof shall relate to a device relative to a floor and/or as it is oriented in the figures or with respect to a surface.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A system comprising:
   a first power supply configured to provide a plurality of voltage rails to gate driver circuitry configured to control a plurality of pairs of semiconductor switches, each pair of semiconductor switches being connected in a half-bridge configuration between a positive DC rail and a negative DC rail of a DC bus, the first power supply receiving a first voltage generated from an external power source,
   the plurality of pairs of semiconductor switches being controlled to transfer phase power to and from a permanent magnet (PM) electric machine;
   a second power supply configured to provide a back-up power to the plurality of voltage rails, the second power supply receiving power from the DC bus; and
   a control module electrically connected to the second power supply and receive power therefrom, the control module configured to receive a sensed voltage of the DC bus and cause the gate driver circuitry to short respective phases of the phase power when a differential voltage of the DC bus is greater than or equal to a first threshold and a condition is satisfied.

2. The system of claim 1, wherein when the differential voltage of the DC bus decreases to a second threshold less than the first threshold after reaching the first threshold, the control module stops causing the gate driver circuity from shorting the respective phases.

3. The system of claim 2, wherein the second threshold is greater than a voltage needed for powering the second power supply to provide the back-up power.

4. The system of claim 2, wherein the system is installed in a vehicle, and wherein the control module receives power from the second power supply when the external power source of the vehicle is OFF and the second power supply is functioning, wherein the condition is the first voltage being less than corresponding threshold voltage and wherein when the first voltage is less than the corresponding threshold voltage and the voltage of the DC bus is greater than or equal to the first threshold, the control module cause the gate driver circuitry to short the respective phases.

5. The system of claim 4, wherein the gate driver circuitry is powered by the second power supply via the plurality of voltage rails when the vehicle is OFF.

6. The system of claim 4, wherein the PM electric machine is connected to wheel axles via an e-axle, and wherein the external power source of the vehicle is OFF when the vehicle is being towed and wherein the control module receives power from the second power supply when the vehicle is being towed.

7. The system of claim 4, wherein the PM electric machine is connected to wheel axles via drive shaft and a differential, and wherein the external power source of the vehicle is OFF when the vehicle is being towed and wherein the control module receives power from the second power supply when the vehicle is being towed while the drive shaft remains connected to the differential and wheel axles.

8. The system of claim 1, wherein the system is installed in an inverter module of a power system for a vehicle, wherein the inverter module comprises a controller configured to issue a command to the gate driver circuitry and one or more communication interfaces configured to communicate with one or more controllers in the vehicle, wherein the controller and the communication interface receives power via one or more control power rails, wherein the condition is when any voltage of the one or more control power rails is less than a set threshold for a corresponding voltage, wherein when any voltage of the one or more control power rails is less than a set threshold for a corresponding voltage and the voltage of the DC bus is greater than or equal to the first threshold, the control module causes the gate driver circuitry to short the respective phases.

9. The system of claim 2, wherein the control module comprises a first comparator configured for hysteresis, and wherein the first comparator is configured to determine whether the voltage of the DC bus is greater than or equal to the first threshold or less than or equal to the second threshold.

10. The system of claim 9, wherein the voltage of the sensed DC bus is filtered and the determination by the first comparator is based on the filtered sensed voltage of the DC bus.

11. The system of claim 10, the control module further comprises a filter to filter the sensed voltage of the DC bus, where the filter is connected to a terminal of the first comparator, wherein the filter sets a control response timing of the first comparator to changes in the sensed voltage of the DC bus,
wherein the filter comprises capacitance and resistance, where a combination of the capacitance and resistance determines the control response timing, wherein the system is installed in an inverter module, the inverter module has capacitance connected to the DC bus,
wherein a DC bus voltage response timing is based on the capacitance connected to the DC bus and an inductance of a stator in the electric machine and
wherein the control response timing is faster than the DC bus voltage response timing.

12. The system of claim 11, wherein the control response timing is at least twice as fast as the DC bus voltage response timing.

13. The system of claim 1, wherein the gate driver circuitry shorts the respective phases in response to a command from a system control unit of a vehicle external to an inverter module having the system.

14. The system of claim 13, wherein the system is further configured to confirm the shorting of the respective phases and issue a notification to the system control unit.

15. The system of claim 1, wherein there are three-pairs of semiconductor switches and three phases, wherein the shorting shorts the three phases.

16. The system of claim 1, wherein the second power supply comprises a DC/DC flyback converter connected to the DC bus.

17. The system of claim 2, wherein the first threshold is about 400V DC and the second threshold is about 100V DC.

18. The system of claim 1, wherein the control module comprises:
a first comparator configured for hysteresis, and wherein the first comparator is configured to determine whether the voltage of the DC bus is greater than or equal to the first threshold or less than or equal to the second threshold;
a second comparator configured to determine whether a control power rail is missing or out of range, where the second comparator receives power generated from the first voltage; an AND gate; and
isolation connected to the second comparator and to the AND gate, wherein the isolation receive power generated from the first voltage and power generated from the second power supply.

19. The system of claim 18, wherein when the power generated from the first voltage is not received by either of the second comparator or the isolation and when the voltage of the DC bus is greater than or equal to the first threshold, the AND gate outputs a signal to cause the gate driver circuitry to short the respective phases.

20. The system of claim 1, wherein the system is installed in inverter modules of a power system for a vehicle and three inverter modules are connected to a same PM electric machine, wherein when the control module in one inverter module causes the gate driver circuitry to short the respective phases, the control modules in the other two inverter modules also cause the gate driver circuitry to short the respective phases.

* * * * *